(12) United States Patent
Sirota et al.

(10) Patent No.: US 7,316,986 B2
(45) Date of Patent: Jan. 8, 2008

(54) GLASS CERAMICS FOR LASER SYSTEMS

(75) Inventors: Marina Sirota, Rehovot (IL); Ehud Galun, Rehovot (IL); Adrian Goldshtein, Haifa (IL); Alla Buch, Kiryat Haim (IL); Vladimir Krupkin, Rishon Lezion (IL); Rami Cohen, Hof Askelon (IL); Alexander Glushko, Kazrin (IL); Elena Luria, Kiryat Uno (IL)

(73) Assignee: Elop Electro-Optics Industries Ltd., Rehovot (IL)

( * ) Notice: Subject to any disclaimer, the term of this patent is extended or adjusted under 35 U.S.C. 154(b) by 70 days.

(21) Appl. No.: 11/138,908

(22) Filed: May 25, 2005

(65) Prior Publication Data

US 2006/0009342 A1    Jan. 12, 2006

Related U.S. Application Data

(63) Continuation-in-part of application No. PCT/IL2004/000540, filed on Jun. 17, 2004.

(60) Provisional application No. 60/480,101, filed on Jun. 19, 2003.

(51) Int. Cl.
C03C 10/02   (2006.01)
C03C 13/04   (2006.01)
H01S 3/17    (2006.01)
G02B 6/02    (2006.01)

(52) U.S. Cl. .............. 501/37; 501/4; 501/10; 501/38; 385/142; 385/144; 372/40

(58) Field of Classification Search .......... 501/4, 501/10, 27, 38, 37; 372/40; 385/142, 144
See application file for complete search history.

(56) References Cited

U.S. PATENT DOCUMENTS

| | | | |
|---|---|---|---|
| 3,681,102 A | 8/1972 | Beall | |
| 5,028,567 A | 7/1991 | Gotoh et al. | |
| 5,483,628 A | 1/1996 | Borrelli et al. | |
| 5,968,857 A | 10/1999 | Pinckney et al. | |
| 6,197,710 B1 | 3/2001 | Ohara et al. | |
| 6,204,211 B1 | 3/2001 | Ohara et al. | |
| 6,297,179 B1 * | 10/2001 | Beall et al. ............ | 501/5 |

FOREIGN PATENT DOCUMENTS

| | | |
|---|---|---|
| EP | 0924171 | 6/1999 |
| EP | 0997445 | 5/2000 |
| JP | 2002154840 | 5/2002 |
| RU | 1811512 | 4/1993 |
| RU | 2114495 | 6/1998 |
| SU | 1811512 | 4/1993 |
| WO | WO-01/28944 A1 | 4/2001 |
| WO | WO-01/289771 A1 | 4/2001 |
| WO | WO 2004/110943 | 12/2004 |

OTHER PUBLICATIONS

Kisilev, A., et al., "Cr (III) in gahnite-containing transparent glass-ceramics: influence of melting conditions and heat treatment on crystallization and spectroscopic properties", Chemical Physics Letters, Sep. 12, 1986, vol. 129, No. 5, pp. 450-457 (XP008036893).

Buch, A., et al., Transparent glass ceramics: preparation, characterization and properties, Material Sciecne and Engineering, 1985, vol. 71, pp. 383-389 (XP008036927).

Bouderbala, M., et al. "Laser spectroscopy of chromium III in magnesium aluminate spinels and transparent glass-ceramics", Chemical Physics Letters, Oct. 17, 1986, vol. 130, No. 5, pp. 438-443 (XP002110315).

Podipensky, A.V., et al., Optics Letters, 1999, vol. 24, No. 14, pp. 960-962.

Camargo, M.B., et al., Optics Letters, 1995, vol. 20, No. 3, pp. 339-341.

Yumashev, Y., et al., Journal of the Optical Society of America B, 1999, vol. 160, No. 12, pp. 2189-2494.

Malyarevich, A.M., et al., "Nanosized glass-ceramics doped with transition metal ions: nonlinear spectroscopy and possible laser applications", Journal of Alloys and Compounds, 2002, vol. 341, pp. 247-250.

International Search Report and Written Opinion mailed Dec. 19, 2005 in PCT/IL2004/000540.

EP Communication dated May 31, 2006 for Appl. No. 05105511.9 - 2111.

EP Search Report for Appl. No. 05105511.9 - 2111.

Tkalcec E Et Al: "Crystallization Of High-Quartz Solid Solution In Gahnite Glass- Ceramics", Journal Of Non-Crystalline Solids, North-Holland Physics Publishing. AMSTERDAM, NL, vol. 129, No. 1/3, Mar. 2, 1991, pp. 174-182, XP000305998, ISSN: 0022-3093.

* cited by examiner

*Primary Examiner*—Karl Group
(74) *Attorney, Agent, or Firm*—Darby & Darby (57) ABSTRACT

A glass-ceramic material, particularly for elements in laser systems, and a method for preparing same. The glass-ceramic material may be used for an optical fiber for communication systems and laser systems. The glass-ceramic may include gahnite crystals and optionally β-quartz-like solid solution, or a petalite-like crystals, spinel, and zirconia crystals. The elements may comprise a host material glass-ceramic, where the glass-ceramic is doped with appropriate ions.

17 Claims, 5 Drawing Sheets

GLASS CERAMICS FOR LASER SYSTEMS

CROSS REFERENCE TO PRIOR APPLICATIONS

This application is a continuation-in-part of International Application No. PCT/IL2004/000540 filed on Jun. 17, 2004 which claims benefit of Provisional Application No. 60/480,101 filed on Jun. 19, 2003. The prior applications are hereby incorporated by reference, in their entirety.

FIELD OF THE DISCLOSED TECHNIQUE

The disclosed technique relates to glass-ceramic materials in general, and to a glass-ceramic material for elements in laser systems and communication systems, in particular.

BACKGROUND OF THE DISCLOSED TECHNIQUE

A laser system operating in the eye-safe wavelength region is valuable for various applications. Such applications include: laser range-finding systems, laser target designating systems, 3D laser imaging and scanning systems, laser radar devices, communication tools, and other uses that may involve human contact with the laser radiation. Most of the aforementioned applications require high peak power in the megawatt range delivered for $10^{-7}$-$10^{-9}$ nanoseconds. Such a peak power can be obtained via "Q-switch" methods. Q-switching involves adding time-variable losses to the laser cavity, temporarily preventing the laser effect and storing the pumping energy at the excited level of the gain material. After the switch is triggered, the intra-cavity losses are rapidly reduced, releasing the stored energy extremely quickly and generating a very strong laser pulse.

A Q-switch can be either an active device, which is controlled or driven by an external signal, or a passive structure that has no external control, but rather operates as a result of its own properties. Passive Q-switching exploits the non-linear properties of a saturable absorber. A saturable absorber is a material that absorbs radiation at the laser wavelength, and has a low value of saturation intensity. Below a specific threshold, the saturable absorber blocks the incoherent light and prevents laser oscillations from building up in the resonator. At some point, the material becomes transparent due to saturation, and a very strong laser pulse is generated. Passive Q-switching is generally preferred to active Q-switching, due to the simplicity of manufacturing and operation, low cost, and reduced system size and weight.

The common materials in solid state eye-safe laser systems are doped single crystals, glasses and ceramics. These materials each have disadvantages. The glass materials suffer from problems of low thermal conductivity and sensitivity to thermal shock, which result in unstable performance and high risk of fracture under high power laser radiation. In general, the high power operation required in eye safe laser applications necessitates high durability of the materials for the laser system.

Material production of a single crystal is expensive. It is also difficult to uniformly dope the optically active element in a single crystal phase and to produce a finished product large enough for practical purposes. Furthermore, achievable dopant concentrations in a single crystal phase are low, in comparison to a non-crystalline phase.

Glass-ceramics are more cost efficient and more suitable for manufacturing than single crystals. Glass-ceramics consist of a glass matrix and a crystal phase. Such materials can remain transparent like the parent glass (i.e., the glass from which the material is formed), if the crystal size is in the "nano" scale. The dopant ions can enter a crystal phase or a glass phase of glass-ceramics. Several compositions have been proposed for glass-ceramic materials for eye-safe laser applications. Examples include: U.S. Pat. No. 5,483,628 to Borrelli et al, entitled "Transparent Glass-Ceramics"; U.S. Pat. No. 6,197,710 to Ohara et al, entitled "Luminous Glass Ceramics"; and U.S. Pat. No. 6,204,211 to Ohara et al, entitled "Luminous Glass Ceramics". Significant limitations of laser elements based on glass-ceramics include low optical quality and low laser damage threshold. An additional disadvantage results from light scattering that occurs in the ceramic materials due to the grainy and porous boundaries, causing significant losses of energy.

The passive Q-switch, which was described above, is one type of element in a laser system. Some fluoride based materials have been used as passive Q-switches operating at the eye-safe wavelength region. Examples include $Er^{3+}$:$CaF_2$, $U^{2+}$:$CaF_2$, $U^{2+}$:$BaF_2$, and $U^{2+}$:$SrF_2$. However these materials have been observed to have a relatively low damage threshold.

Materials based on $Co^{2+}$ ions doped semiconductors have been tested for use as a saturable absorber for the eye-safe wavelength region (A. V. Podipensky, V. G. Shcherbitsky, N. V. Kuleshov, V. I. Levchenko, V. N. Yakimovich, and V. P. Michailov, "Optics Letters", Vol. 24, No. 14, 1999, pp. 960-962). However, $Co^{2+}$ ions doped semiconductors also have a low laser damage threshold and therefore cannot be used in the laser cavity.

Single crystals were also tested for similar use (M. B. Camargo, R. D. Stulz, M. Kokta, and M. Birnbaum, "Optics Letters", Vol. 20, No. 3, 1995, pp. 339-341; K. V. Yumashev, I. A. Denisov, N. N. Posnov, V. P. Michailov, R. Moncorge, D. Vivien, B. Ferrand, Y. Guyot, "Journal of the Optical Society of America B", Vol. 160, No. 12, 1999, pp. 2189-2494). One such system is disclosed in U.S. Pat. No. 5,654,973 to Stultz et al, entitled "Laser System Using $Co^{2+}$-Doped Crystal Q-Switch". The Q-switching utilizes the properties of the $Co^{2+}$ ion, which acquires properties of a saturable absorber when it is located in the tetrahedral crystal field. $Co^{2+}$ doped single crystals, such as Co doped garnets and spinels, have satisfied optical quality requirements and demonstrate relatively high damage threshold. However, growth of a single crystal is a complicated and expensive process.

An alternative technique uses $Co^{2+}$ doped glass ceramics materials (A. M. Malyarevich, I. A. Denisov, Y. V. Volk, K. V. Yumashev, O. S. Dimshits, A. A. Zhilin, "Journal of Alloys and Compounds", No. 341, 2002, pp. 247-250). On the assumption that $Co^{2+}$ ions enter the crystal phase of the glass-ceramics, the ions can occupy the same location that they occupy in the single crystal. Therefore, the $Co^{2+}$ ion in the glass-ceramics matrix can have a high absorption cross-section, low saturation fluence, and optimal decay time of the required transition like in the single crystal phase, resulting in high performance of the device. Sufficiently high performance of passive Q-switches based on those materials has been achieved. However, low optical quality and low damage threshold of the glass-ceramics limit their application in the laser systems.

Several compositions have been proposed for a glass-ceramic material suitable for passive Q-switching of eye-safe lasers. Examples include: Russian Federation Patent RU 2,114,495 C1 to Bojko et al, entitled "Passive Q-Switch Material" and USSR Patent SU 1,811,512 A3 to Bojko et al, entitled "Glass for Clear Glass Ceramic Material on Gahnite-Base".

SUMMARY OF THE DISCLOSED TECHNIQUE

It is an object of the disclosed technique to provide a novel glass-ceramic material and a method for its preparation. The glass-ceramic material may be of a type containing gahnite crystals and optionally β-quartz-like solid solution in the crystal phase, and a glassy phase. Alternatively, the glass-ceramic material may be of a type containing petalite-like crystals, spinel, and zirconia crystals in the crystal phase, and a glassy phase. The glass-ceramic material may be doped with an appropriate dopant ion, which provides the host material with the properties of stimulated emission or saturable absorption. The glass-ceramic material may be used as a lasing element or as a saturable absorber in a laser system. For example, the glass-ceramic material may be used as a Q-switch in a laser system. The laser system preferably operates in the eye-safe wavelength region. The glass-ceramic material may be used to form an optical fiber. The optical fiber may be used in a laser system or a communication system. For example, the optical fiber may be used as a lasing element, a saturable absorber, an element for amplified spontaneous emission suppression, an element for noise suppression, an element for spectrum correction, and an element for signal attenuation.

In accordance with the disclosed technique, there is also provided a method for the preparation of the glass-ceramic material. The method includes the procedure of preparing batches, where the batches include raw materials of components of the glass-ceramic in a certain composition. The method further includes the procedures of melting the batches to form the parent glass, pouring the glass melt on moulds to form steel plates, annealing the formed plates, and cooling the annealed plates. The method further includes the procedures of nucleation and crystallization.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique provides a suitable glass-ceramic material for use as elements in laser systems and communication systems. The laser system preferably operates in the eye-safe wavelength region. In particular, the material may be used for lasing elements, such as a laser rod, or a passive Q-switch. The elements may appear in different shapes, e.g., plate, thin plate, cylinder, fiber, and the like. The glass ceramics may be doped with an appropriate dopant ion, which provide the host material with the properties of stimulated emission (i.e., lasing) or saturable absorption. The material may also be used for elements in a fiber-optic system. An additional application is the preparation of a monolithic laser system, where the passive Q-switch, made of the glass-ceramic, and the amplification element, either of glass-ceramic, glass or single crystal, are directly bonded. The glass-ceramic material (also referred to as "GC" herein below) is transparent, robust, has high optical quality, and is suitable for the manufacturing process. The disclosed technique further provides a method for the preparation of the glass-ceramic material.

The glass-ceramics developed according to the disclosed technique are able to withstand working environment conditions and also exhibits good thermal conductivity. Furthermore, the material exhibits high performance, is low cost, and is suitable for the manufacturing process. The improved spectral, optical and mechanical properties of the proposed material are achieved due to the special thermal treatment and unique phase composition of the glass-ceramics.

Two types of glass-ceramics are developed pursuant to the disclosed technique. The first type of glass-ceramic, referred to as "Gahnite-GC" herein below, includes a crystal phase with gahnite crystals and optionally β-quartz-like solid solution, and a glassy phase. Gahnite is a mineral from the spinel group. The chemical formula of gahnite is $ZnAl_2O_4$. The structure of β-quartz, which has the general formula "$SiO_2$", consists of corner-sharing $SiO_4$ tetrahedra. Thus, each silicon atom is bonded to four oxygen atoms, and each of these oxygen atoms is bonded to two silicon atoms. The β-quartz-like solid solution in Gahnite-GC includes Li and Al ions, which substitute Si in the crystal lattice of β-quartz in the ratio of 1:1.

The Gahnite-GC glass-ceramic is based on a composition of $SiO_2$—$Al_2O_3$—ZnO—$Li_2O$. The relative percentages of each material in the composition of the parent glass for Gahnite-GC preparation is presented in Table 1.

TABLE 1

| Composition of parent glass in the Gahnite-GC batch (mole %). | | | | | |
|---|---|---|---|---|---|
| $SiO_2$ | $Al_2O_3$ | ZnO | $Li_2O$ | $TiO_2$ | $ZrO_2$ |
| 63-75 | 8-12.5 | 6-10 | 2-5 | 1-4 | 0.5-3 |

The second type of glass-ceramic, referred to as "Petalite-GC" herein below, consists of a petalite-like, spinel and zirconia crystals in the crystal phase, and a glassy phase. Petalite refers to aluminosilicates. The chemical composition of petalite is lithium aluminum silicate with the chemical formula: $LiAlSi_4O_{10}$. The petalite-like phase of Petalite-GC is a metastable phase and usually appears as a series of solid solutions on the base of $MgO.SiO_2$, obtained as a result of the substitution of Si ions for aluminum (Al) and magnesium (Mg) in the layered structure: $2Si^{4+} \rightarrow 2Al^{3+}+Mg^{2+}$, or due to the introduction of $(AlO_4)Mg_{0.5}$ between layers (A. Buch, M. Ish-Shalom, and R. Reisfeld, "*Materials Science and Engineering*", No. 71, 1987, pp. 383-389).

The Petalite-GC glass-ceramic is based on a composition of $SiO_2$—$Al_2O_3$—$MgO$. The relative percentages of each material in the composition of the parent glass for Petalite-GC preparation is presented in Table 2.

TABLE 2

Composition of parent glass in the Petalite-GC batch (mole %).

| $SiO_2$ | $Al_2O_3$ | MgO | $TiO_2$ | $ZrO_2$ |
|---|---|---|---|---|
| 44-50 | 15-20 | 10-25 | 3-10 | 3-8 |

Figure 1A:
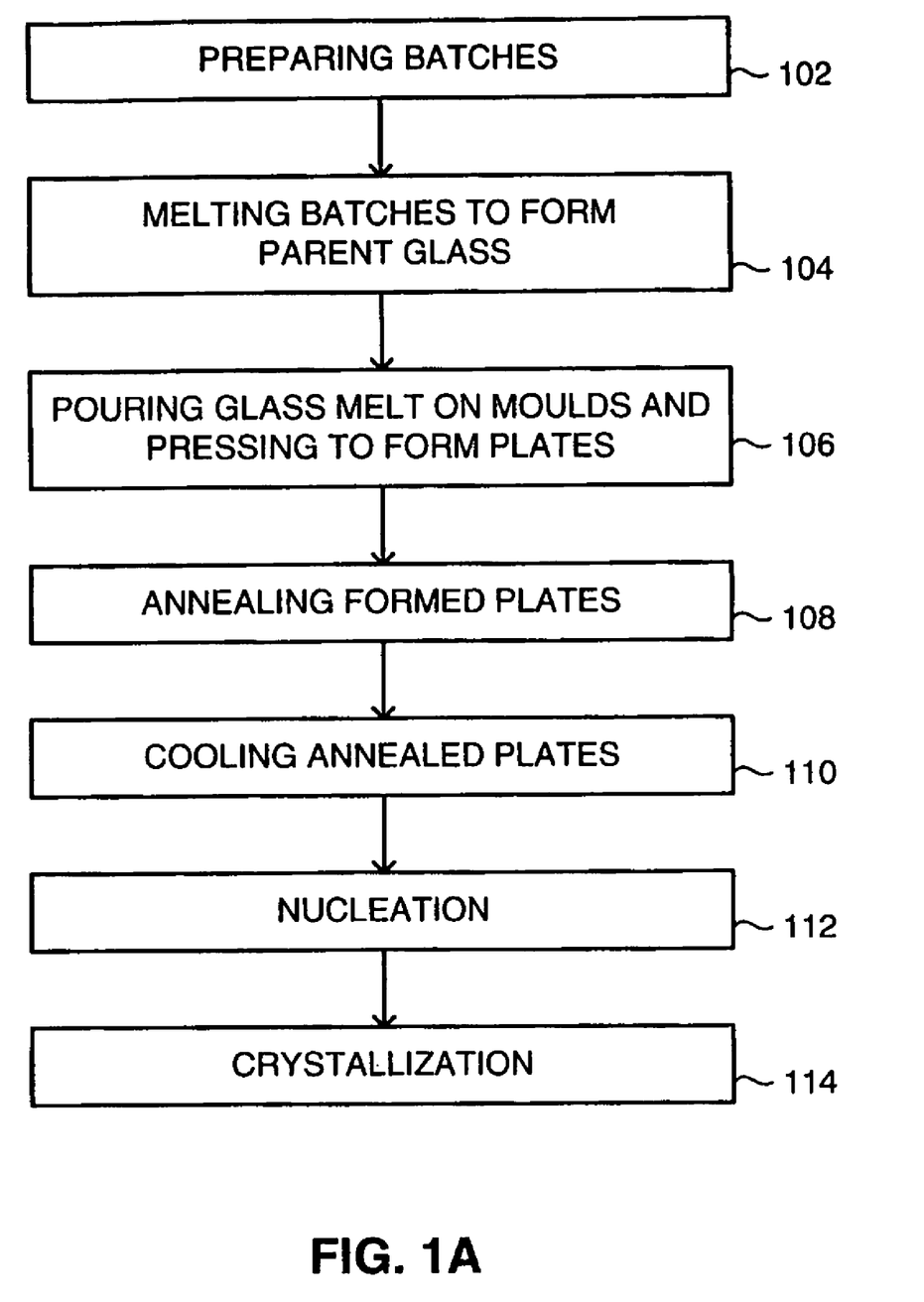
FIG. 1A is a block diagram of a method for preparation of a glass-ceramic ("GC") material, operative in accordance with an embodiment of the disclosed technique.

Reference is now made to FIG. 1A, which is a block diagram of a method for preparation of a glass-ceramic material, operative in accordance with an embodiment of the disclosed technique.

In procedure 102, batches are prepared. Several batches are prepared for either Gahnite-GC or Petalite-GC. The relative percentages of each material in the composition of the parent glass for Gahnite-GC and Petalite-GC preparation are as presented in Tables 1 or 2, respectively.

The raw materials are weighed and mixed to prepare the batches for the parent glass preparation. The raw materials are preferably reagent grade and consist of pure sand for introducing $SiO_2$ into the batch, of $Li_2CO_3$ for $Li_2O$ insertion, and oxides for the rest. The batch ingredients are thoroughly dry mixed for an appropriate duration (e.g., one hour). The ready batches are placed in crucibles. Silica crucibles may be used for the Gahnite-GC batches, while alumina crucibles may be used for the Petalite-GC batches.

In procedure 104, the batches are melted to form the parent glass. Melting is performed at 1,650-1,670° C. for the Gahnite-GC batches, and at 1,600-1,620° C. for the Petalite-GC batches. The batches are melted in an electric furnace for two to three hours. The material is then stirred at the melting temperature to enhance fining of the melt. Fining of the glass melt can be further enhanced by introducing half percent of $As_2O_3$ in addition to one percent of $NH_4NO_3$ into the batch. $TiO_2$ and $ZrO_2$ are used as nucleators. Lithia and alumina may be added in order to decrease the melting temperature and to shift the material composition to gahnite crystallization, so that gahnite appears as a major crystalline phase, while β-quartz-like solid solution forms as a minor phase.

In procedure 106, the glass melt is poured on steel moulds and then pressed to form 5-7 mm thick plates. The glass may be formed into various shapes, such as plate shape, thin plate shape, cylinder shape, and fiber shape. The formed hot plates are immediately placed in a furnace preheated to 680-730° C. for annealing, in procedure 108. Annealing is performed for the purpose of stress removal during glass preparation. After being kept at the annealing temperature for one hour, the plates are cooled at the natural cooling rate of the furnace, in procedure 110. The slow cooling from an initial temperature of about 700° C. prevents the development of strong mechanical stresses within the glass plate.

The parent glass is transformed into a glass-ceramic by a two stage crystallization process effectuated by thermal treatments. This two stage process includes a low temperature nucleation stage in procedure 112, and a higher temperature stage of crystallization in procedure 114. The nucleation can be performed at 690-780° C. The temperature of crystallization is selected to be as high as possible while still providing for transparency of the glass-ceramic material. The crystallization may be carried out at 870-915° C. for Gahnite-GC and at 840-900° C. for Petalite-GC. The soaking time at the crystallization temperature is about two hours.

Figure 1B:
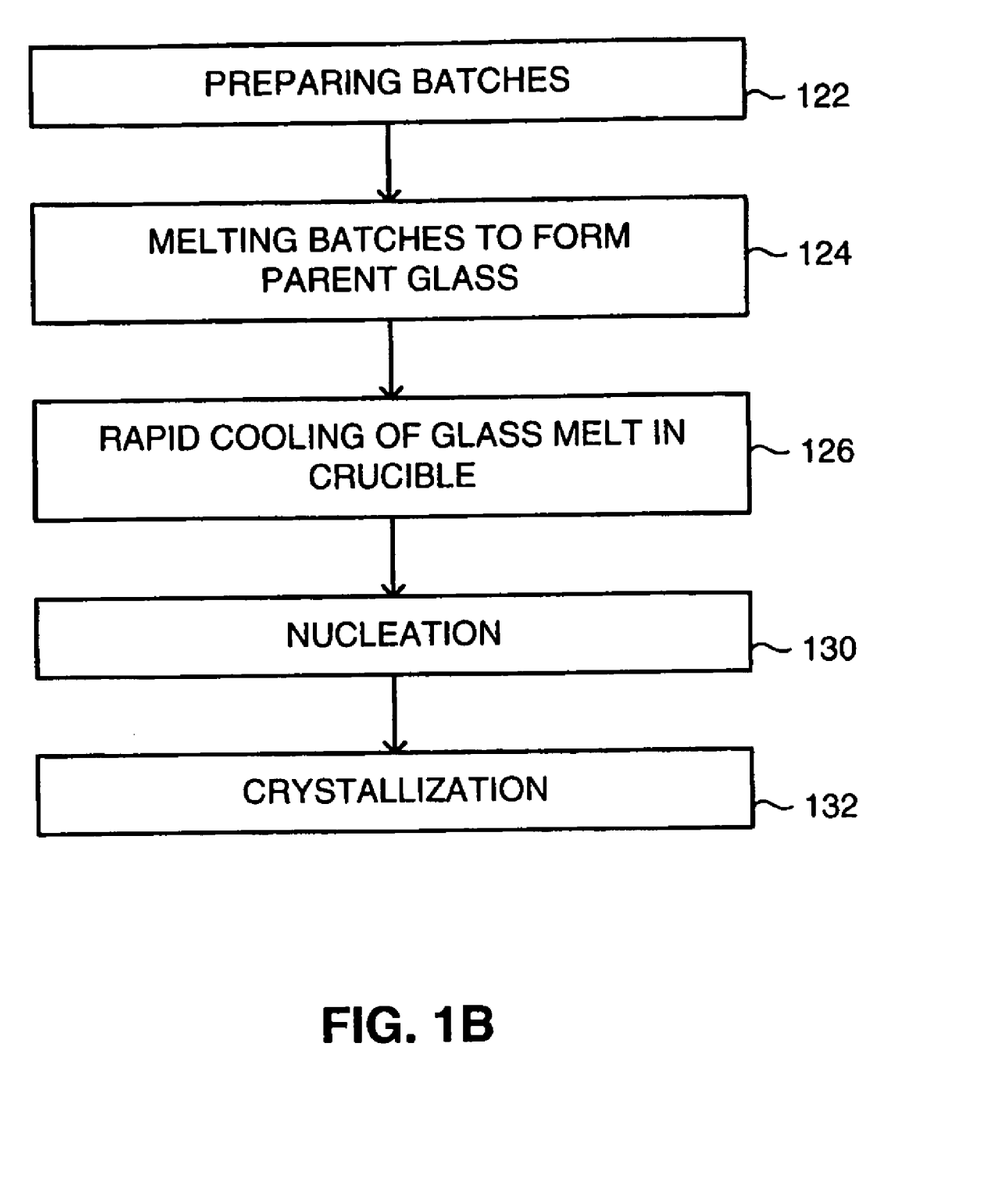
FIG. 1B is a block diagram of another method for preparation of a glass-ceramic material, operative in accordance with another embodiment of the disclosed technique.

Alternatively, another technique may be used for preparation of the glass-ceramic. Reference is now made to FIG. 1B, which is a block diagram of another method for preparation of a glass-ceramic material, operative in accordance with another embodiment of the disclosed technique.

In procedure 122, batches are prepared. The raw materials are weighed and mixed to prepare the batches for preparation of the parent glass. The batch ingredients are thoroughly dry mixed for an appropriate duration. The ready batches are placed in crucibles. Procedure 122 is analogous to procedure 102 with reference to FIG. 1A.

In procedure 124, the batches are melted to form the parent glass. The batches are melted in an electric furnace for two to three hours. The material is then stirred at the melting temperature to enhance homogeneity and fining of the glass melt. Procedure 124 is analogous to procedure 104 with reference to FIG. 1A. The crucible containing the glass melt is then cooled at room temperature for about 5 to 10 minutes, so as to avoid glass crystallization.

In procedure 126, the glass melt is rapidly cooled in the crucible. The crucible with the glass melt is abruptly cooled in the air, until it approximately reaches the transformation temperature (i.e., the temperature at which the parent glass is transformed into a glass-ceramic). The rapid cooling causes the glass melt to avoid uncontrolled glass crystallization.

Thereafter, in procedures 130 and 132 a two stage crystallization process is performed, analogous to procedures 112 and 114 with reference to FIG. 1A. The crucible is first heated to a nucleation temperature of about 690-780° C. (procedure 130), followed by a crystallization temperature of about 870-915° C. for Gahnite-GC and about 840-900° C. for Petalite-GC (procedure 132). The glass-ceramic block is then cut out mechanically from the crucible. It is noted that in the method of FIG. 1B, annealing is not performed on the glass melt (as in the method of FIG. 1A). Instead, an equivalent process is performed after the parent glass has already been transformed into a glass-ceramic, as part of the crystallization procedure.

The resulting materials consist of a crystal phase dispersed into a glassy phase. The glass-ceramic remains transparent because the grain size of the crystals dispersed in the glassy phase is smaller than the wavelength of the visible light. The grain size of the crystals should conform to the required operational wavelength range of the system in which the glass-ceramic is installed, such that the glass-ceramic is transparent at the desired wavelength range. In an experiment, the average crystal size was shown to be 50 nm (as determined with a diffraction pattern). The operational wavelength range can extend beyond the visible light, as detailed below. The crystal phase consists of either gahnite crystals and optionally β-quartz-like solid solution, in the case of Gahnite-GC composition, or petalite-like crystals, spinel and zirconia ($ZrO_2$) crystals in the case of Petalite-GC composition. The phase composition may be determined with the aid of X-ray measurements. In an experiment, a resulting GC was found to have the following properties: refraction index of 1.535, melting point at 1350° C., softening temperature $T_f$ of 780° C., and thermal coefficient of linear expansion of $3.3 \times 10^{-6}$ $C.^{-1}$.

It is noted that the methods of FIGS. 1A and 1B differ in certain aspects from techniques known in the art. These differences serve to make the methods of FIGS. 1A and 1B simple, versatile, and provide additional useful properties to the final glass-ceramic product. For example, the glass-ceramic composition developed in accordance with the disclosed technique uses a relatively small amount of initial raw materials. This helps make the preparation process both simple and inexpensive. Also, the composition developed in accordance with the disclosed technique provides low viscosity and decreases the melting point of the parent glasses. This results in high optical quality due to easy batch homogenization and the elimination of bubbles. As well, the absence of phosphates ($P_2O_5$) in the glass-ceramic composition developed in accordance with the disclosed technique enhances the chemical stability of the material. Finally, the absence of PbO in the formulations for the batch preparation is noted. PbO is poisonous, increases the refraction index and decreases the damage threshold of the resulting material.

The composition of the glass-ceramic material, together with the recommended thermal treatment, results in the formation of the two crystal phases dispersed in the glassy phase: gahnite crystals and optionally β-quartz-like solid solution in Gahnite-GC and petalite-like crystals, spinel and zirconia in Petalite-GC. The main crystal phase (gahnite or petalite-like crystals) serves as host materials for the optical active elements. Spinel, as an added crystalline phase in Petalile-GC, may also serve as a host material for the optical active elements.

Dopant ions are added to the host material glass-ceramic, for providing the glass-ceramic with desired properties. The following list of ions, which could be doped to the host crystals, provide stimulated emission, enabling the glass-ceramic to function as a lasing element in a laser system: Ce, Pr, Nd, Sm, Eu, Gd, Tb, Dy, Ho, Er, Tm, Yb, Cr, and Ti (S. Hufner, "*Optical Spectra of Rare Earth Compounds*", Academic Press, NY, 1978). The concentration of the dopant ions in the host crystal, whether a single ion or a combination of ions is doped, ranges between 100 ppm to 10,000 ppm, and is preferably about 1,000 ppm. It is noted that Cr, Co, U, Ni, Fe, V, and Er ions, when doped to the host phase, could provide both functions: stimulated emission and saturable absorption, depending on the wavelength range as well as the particular device configuration. It should be noted that a single GC material may contain at least one of the dopants, or a combination of numerous dopants, and may combine the properties of stimulated emission and saturable absorption.

A glass-ceramic material according to the disclosed technique is suitable for a passive Q-Switch, since such a material acquires the properties of a saturable absorber when doped with appropriate ions. It is noted that the following description of the disclosed technique is based on a passive Q-switch prepared in accordance with either the method of FIG. 1A or the method of FIG. 1B.

A passive Q-switch is formed from Gahnite-GC or Petalite-GC glass-ceramic materials with a sufficient concentration of $Co^{2+}$ therein (as a dopant ion) to act as a saturable absorber in the wavelength range of 0.2 μm to 5 μm, and preferably in the eye-safe wavelength range of 1.3 μm to 1.8 μm. The GC matrix provides the "correct" crystallographic configuration of the absorber ion, assisting the $Co^{2+}$ ions to preferentially enter the tetrahedrally coordinated sites, where it has an adequate system of electronic states (i.e., the interstate transitions are at the same frequencies as the lasing process).

The Co(II)-acetat tetrahydrat ($C_4H_4CoO_4 \cdot 4H_2O$) as $Co^{2+}$ source is introduced in the initial batch of raw materials (procedure 102 in FIG. 1A) before the preparation of the parent glass. The $Co^{2+}$ enters the melt in the CoO form. The CoO content in the melt is varied between 0.05-0.3 weight percent. $Co^{2+}$ enters into the crystal phase of the glass-ceramics, particularly into the gahnite and petalite-like crystals. The cobalt content may be varied to tune the performance of the Q-switch and the laser system. The preferred content is about 0.09-0.14 weight percent.

Figure 2:
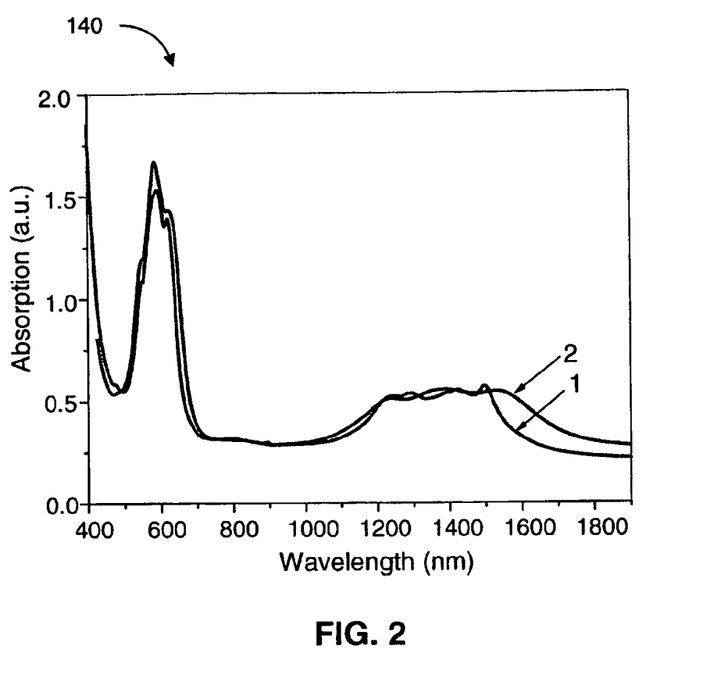
FIG. 2 is a graph of the absorption spectra of Co:Gahnite-GC and Co:Petalite-GC measured at room temperature.

Reference is now made to FIG. 2, which is a graph, generally referenced 140, of the absorption spectra of Co:Gahnite-GC and Co:Petalite-GC measured at room temperature. Curve 1 corresponds to the absorption spectrum of Co:Gahnite-GC, and curve 2 corresponds to the absorption spectrum of Co:Petalite-GC.

According to the absorption spectra, Co ions occupy tetrahedrally coordinated sites. The wide absorption band allows for the Co doped glass-ceramic material to be used in the wavelength region of 1.0-1.7 μm. It is noted that the spectrum of the Co:Petalite-GC material is shifted to the red region, so that the absorption band appears at 1.536 μm, which is the wavelength that fits the emission line of an Er:glass (Erbium doped glass) laser.

The absorption spectra of the Co-doped glass-ceramic have been further measured at the temperatures 0-80° C. and operability of the passive Q-switches over this range of temperatures has been confirmed.

The saturation behavior of the Co:Gahnite-GC and Co:Petalite-GC passive Q-switches has been measured using the 1.57 μm output of a KTP (Potassium Titanyl Phosphate $KTiOPO_4$) optical parametric oscillator pumped by a 1,064 nm Nd:YAG laser with a pulse duration of 12 nanoseconds. The output beam has been focused with a 25 cm focal length lens. The energy fluence through the sample has been varied by changing the sample position along the output beam path.

Figure 3:
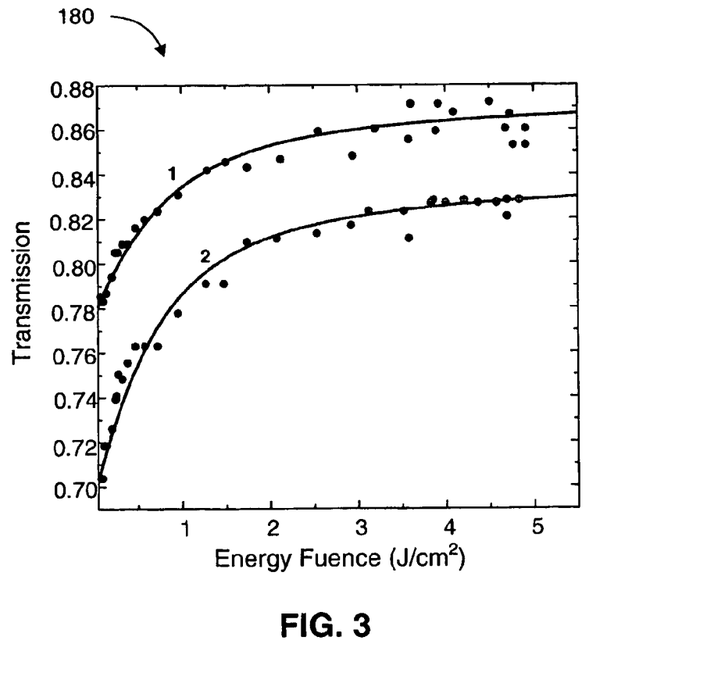
FIG. 3 is a graph of the transmission of Co:Gahnite-GC and Co:Petalite-GC samples as a function of energy density.

Reference is now made to FIG. 3, which is a graph, generally referenced 180, of the transmission of Co:Gahnite-GC and Co:Petalite-GC samples as a function of energy density. Graph 180 illustrates the saturation behavior of the Co:Gahnite-GC and Co:Petalite-GC passive Q-switches. Curve 1 corresponds to the transmission spectrum of Co:Gahnite-GC, and curve 2 corresponds to the transmission spectrum of Co:Petalite-GC. The dots in graph 180 represent experimental data.

The saturation measurement data have been analyzed with a "slow saturable absorber model", developed by Z. Burstein et al. (Z. Burstein, "*IEEE Journal of Quantum: Electronics*", No. 34, 1998, pp. 292-299). The lines in graph 180 represent fitting results. The best fit to the experimental data is obtained with the following values for Co:Gahnite-GC: the ground state absorption cross section $\sigma_{GSA}$ is determined as $3.4 \times 10^{-19}$ cm$^2$ and the excited state absorption cross section $\sigma_{ESA}$ is $0.37 \times 10^{-19}$ cm$^2$. The resultant saturation fluence is 0.37 J/cm$^2$. The resultant parameters for Co:Petalite-GC are: $\sigma_{GSA}=3.6 \times 10^{-19}$ cm$^2$, $\sigma_{ESA}=0.66 \times 10^{-19}$ cm$^2$ and saturation fluence of 0.35 J/cm$^2$.

The resistance of GC to the laser radiation has been measured. The Co:Gahnite-GC material is not damaged at a laser power of 1 GW/cm$^2$, thereby indicating a high damage threshold. The Co:Petalite-GC material begins to damage at 600 MW/cm$^2$, and therefore is operable, but less robust than the Co:Gahnite-GC material.

Wave front distortion caused by Co:Gahnite-GC and Co:Petalite-GC samples has been measured with a double pass Zygo interferometer. The resulting measurement is about λ/4 at 632.8 nm, over clear aperture of 10 mm in diameter. This indicates sufficient optical quality of the samples.

Figure 4:
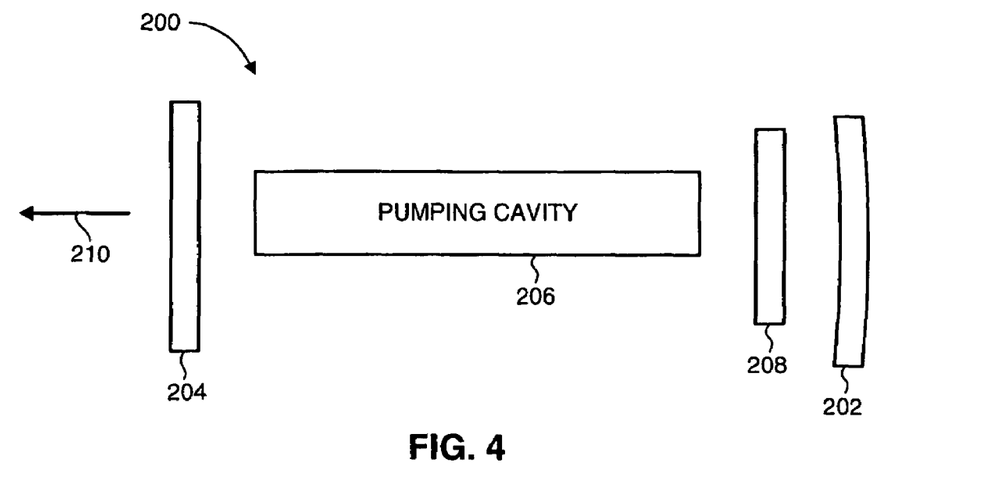
FIG. 4 is a schematic illustration of a passively Q-switched laser system, constructed and operative in accordance with a further embodiment of the disclosed technique.

Reference is now made to FIG. 4, which is a schematic illustration of a passively Q-switched laser system, generally referenced 200, constructed and operative in accordance with a further embodiment of the disclosed technique. System 200 includes a back reflector 202, a flat output coupler 204, a pumping cavity 206, and a passive Q-switch 208. It is noted that passive Q-switch 208 is shown in FIG. 4 located between pumping cavity 206 and reflector 202. It will be appreciated that passive Q-switch 208 may also be located between pumping cavity 206 and coupler 204, or in any suitable constellation.

Back reflector 202 is an optical device, such as a mirror, and is typically flat or concave, as exemplified in FIG. 4. The shape of reflector 202 may be spherical, ellipsoidal, paraboloidal, and the like. Reflector 202 reflects incident light toward coupler 204.

Output coupler 204 is an optical device, such as a flat mirror, and is partially transmissive. Reflector 202 and coupler 204 reflect light generated by an active medium in pumping cavity 206 back and forth to build up amplification. The amplified light is emitted through output coupler 204, toward the output direction, designated by arrow 210.

Reflector 202 and coupler 204 together comprise a laser resonator. Inside pumping cavity 206 are a laser rod and a light source. The laser rod is a solid-state, rod-shaped lasing medium in which ion excitation is caused by a source of intense light, such as a flash-lamp or a diode.

Passive Q-switch 208 controls the ability of the laser resonator to oscillate. In particular, passive Q-switch 208 keeps the Q-factor of the resonator low to temporarily prevent lasing action. When a high energy level is stored, the laser emits a pulse of very high-peak power. Q-switch 208 is a passive Q-switch based on a saturable absorber.

A laser system, such as system 200, was built and operated to demonstrate the performance of a passive Q-switch based on either Co:Gahnite-GC or Co:Petalite-GC, prepared in accordance with the disclosed technique. The laser system was formed with a concave back reflector and flat output coupler, having reflectivity of ~90% at 1,540 nm. The laser rod was 3×40 mm in size and composed of Er:glass. The laser resonator cavity was about 7 cm long. The cavity was pumped with a flash-lamp. The Co:glass-ceramics (i.e., cobalt doped glass-ceramics) passive Q-switch material preferably has a higher absorption cross-section than the stimulated emission cross-section of the lasing element, so that no separate focusing elements are required inside the cavity.

The laser system was operated with each of both types of $Co^{2+}$ doped glass-ceramics: Co:Gahnite-GC and Co:Petalite-GC. For the Q-switch performance measurement experiments, $Co^{2+}$ doped glass-ceramic bulk material was prepared in plate shapes of 0.4 mm width. The resultant material provided transmission of 90%. The Co:glass-ceramics plates were polished and anti-reflective (AR) coated.

Figure 5:
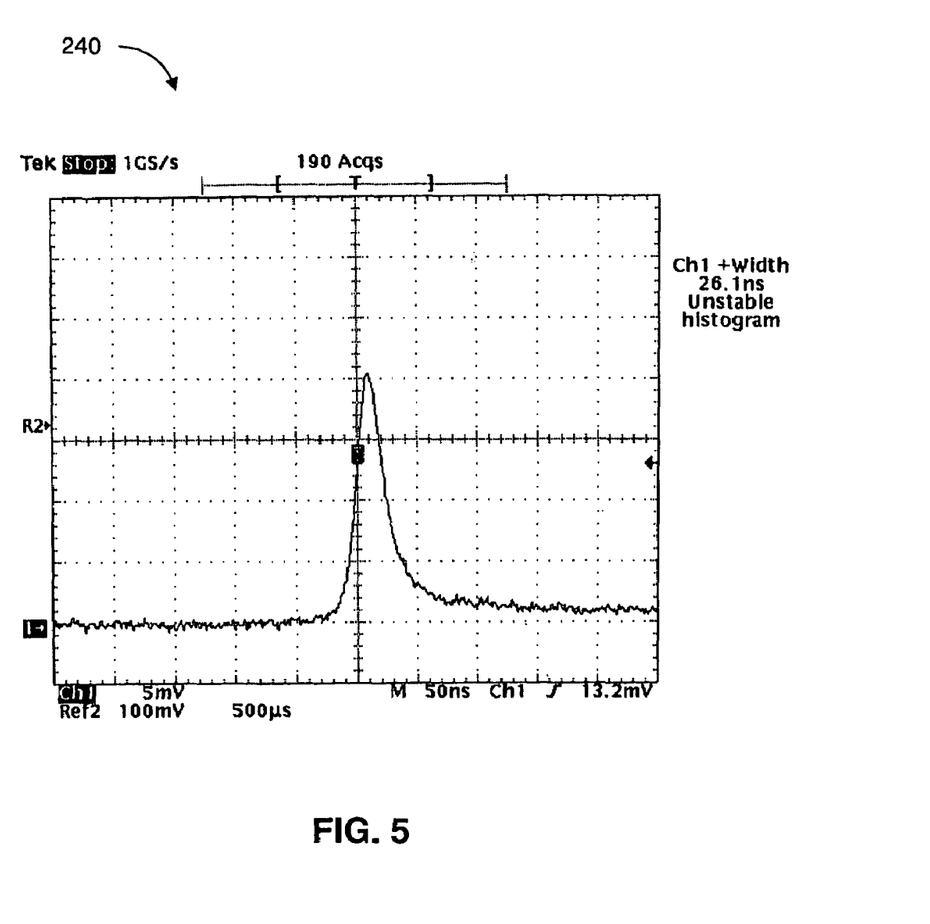
FIG. 5 is an oscilloscope trace of the light output of the laser system of FIG. 4 as a function of time.

Reference is made to FIG. 5, which is an oscilloscope trace, generally referenced 240, of the light output of the laser system of FIG. 4 as a function of time. Graph 240 is based on a Co:Gahnite-GC passive Q-switch for a single output pulse. The output pulse has full width half maximum (FWHM) of 26 ns. The output pulse energy was about 5 mJ.

The results of the laser system operated with Co:Petalite-GC were as follows: the output pulse displayed an energy beyond 3 mJ and a FWHM of about 35 ns. Both systems have been operated reliably for thousands of pulses. The Co ion in the proposed glass-ceramics matrix demonstrates high absorption cross-section, low saturation fluence and sufficient performance.

Another application for the glass-ceramic developed in accordance with the disclosed technique is a monolithic laser system, where the saturable absorber, made of the glass-ceramic, and the amplification element, either of glass-ceramic, glass or single crystal, are directly bonded. This application takes advantage of the superb surface quality that can be achieved when optically processing the glass-ceramic, as well as the relatively low melting point thereof, to form a mono-block laser resonator with direct chemical bonding between the different elements. An example of such an application is a monolithic micro-laser operating at a wavelength of 1.5 µm.

The variation in the proportions of the crystal phases in the glass-ceramics allows the refraction index to be controlled, providing maximal transparency of the material. Control over the refraction index of the developed transparent glass-ceramics also allows preparation of a waveguide from the GC material developed in accordance with the disclosed technique in the shape of thin fibers, such as optical fibers. An optical fiber exploits total internal reflection by having an inner region (i.e., a core) of high refractive index and a cladding of lower index. Light is confined by repeated reflections. Single strands of transparent material can convey trapped light over long distances with very low loss. The good thermal and mechanical properties of the developed glass-ceramics enable thin fibers to be drawn from a preform. The GC material developed in accordance with the disclosed technique is compatible with numerous methods of preform preparation. The preform can be prepared from separate parts for core and cladding, each having a different refraction index and different dopants. Dopants may be placed in either the core or the cladding of the optical fiber. The core may have a cylindrical shape of 0.5-5 mm in diameter and a length of about 50-1,000 mm. The cladding may be a tube shape having outer diameter of 5-50 mm, inner diameter that matches the core, and a length of about 50-1,000 mm. For the final preform preparation, the core is inserted in the cladding tube. Transparent homogenous optical fibers of high optical quality with diameters of 0.1-3.0 mm can be drawn from such a preform. The compositions and properties of such fibers are identical to those of the parent glass. The procedures of nucleation and crystallization are applied for transforming the glass fibers to glass-ceramic fibers. Optical fibers prepared from the GC material developed in accordance with the disclosed technique can be used in fiber-optic laser systems and fiber-optic communication systems, as a lasing element, a saturable absorber, for suppression of amplified spontaneous emission, for noise suppression, or for spectrum correction and attenuation.

Figure 6:
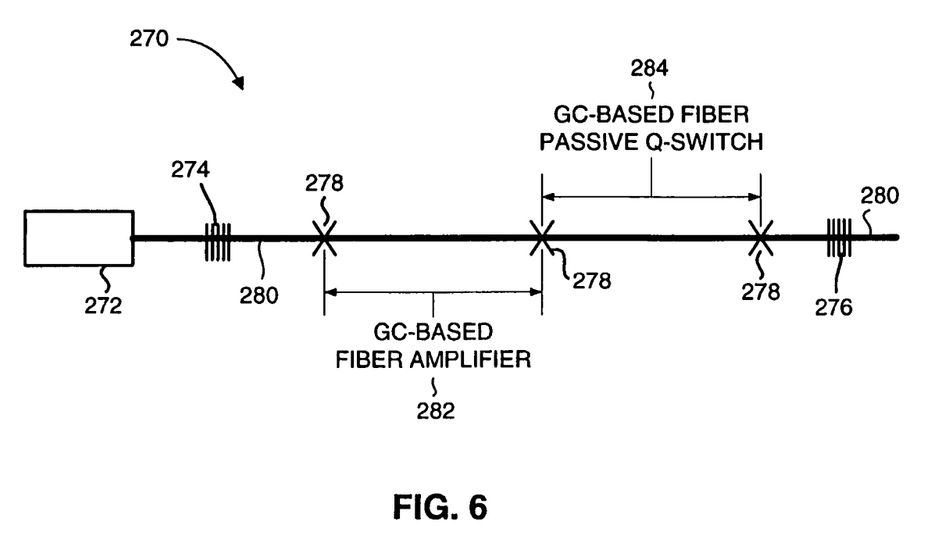
FIG. 6 is a schematic illustration of a fiber-optic laser system, constructed and operative in accordance with another embodiment of the disclosed technique.

Reference is made to FIG. 6, which is a schematic illustration of a fiber-optic laser system, generally referenced 270, constructed and operative in accordance with another embodiment of the disclosed technique. System 270 includes a pumping diode 272, fiber Bragg gratings 274 and 276, splices 278, optical fibers 280, a GC-based fiber amplifier 282, and a GC-based fiber passive Q-switch 284.

Laser system 270 consists of several optical fibers (not shown), such as optical fiber 280. Each such optical fiber has a core diameter of 0.01 mm and cladding diameter of 0.125 mm. The numerical aperture (NA) of the core is 0.14. Fiber passive Q-switch 284 is analogous to Q-switch 208. Fiber passive Q-switch 284 is doped with Co, while fiber amplifier 282 is doped with Er, in compositions in accordance with the disclosed technique. Fiber passive Q-switch 284 has a length of about 50 mm. Fiber amplifier 282 has a length of about 5 meters. Fiber Bragg gratings 274 and 276 serve as reflectors of fiber-optic laser system 270, and together form the fiber laser resonator. The reflectivity of fiber Bragg gratings 274 and 276 is 100% and 4-20%, respectively, at 1550 nm, and less than 1% at 980 nm. The optical fibers of laser system 270 are connected by splicing them together via splices 278. The optical fibers are further coupled to pumping diode 272 operating at 980 nm.

The pumped radiation from pumping diode 272 passes through fiber Bragg gratings 274 and is absorbed in fiber amplifier 282, exciting ions of Er. Spontaneous emission of Er is amplified in fiber amplifier 282 and is reflected back and fourth between fiber Bragg gratings 274 and 276. The gain and intensity of radiation in optical fiber 280 increase with pumping, and eventually reaches saturation fluence of the saturable absorber. Losses in fiber passive Q-switch 284 are reduced at this point, and the round trip gain of laser system 270 increases significantly above a factor of one. The intensity of intra-cavity radiation increases rapidly, and a high power laser pulse is emitted from fiber-optic laser system 270 through the output via fiber Bragg grating 276.

It will be appreciated by persons skilled in the art that the disclosed technique is not limited to what has been particularly shown and described hereinabove. Rather the scope of the disclosed technique is defined only by the claims, which follow.

The invention claimed is:

1. A glass-ceramic material, comprising a glass phase and a crystal phase, said crystal phase comprising gahnite crystals, or gahnite crystals and β-quartz-like solid solution, said glass ceramic-material comprising the following components, expressed in terms of mole percent:

|  | mole % |
|---|---|
| $SiO_2$ | 63-75 |
| $Al_2O_3$ | 8-12.5 |
| ZnO | 6-10 |
| $Li_2O$ | 2-5 |
| $TiO_2$ | 1-4 |
| $ZrO_2$ | 0.5-3, | wherein said crystal phase is doped with at least one dopant ion selected from the group consisting of:
Ce, Pr, Nd, Sm, Eu, Gd, Tb, Dy, Ho, Er, Tm, Yb, Ti, Co, U, Ni, Fe, V, and Er.

2. A glass-ceramic material as in claim 1, wherein the concentration of said dopant ion is 10 ppm-10,000 ppm.

3. A passive Q-switch for a laser system comprising a glass-ceramic material, said glass-ceramic material comprising a glass phase and a crystal phase, said crystal phase comprising gahnite crystals, or gahnite crystals and β-quartz-like solid solution, said glass-ceramic material comprising the following components, expressed in terms of mole percent:

|  | mole % |
|---|---|
| $SiO_2$ | 63-75 |
| $Al_2O_3$ | 8-12.5 |
| ZnO | 6-10 |
| $Li_2O$ | 2-5 |
| $TiO_2$ | 1-4 |
| $ZrO_2$ | 0.5-3, | wherein said crystal phase is doped with at least one dopant ion selected from the group consisting of:
Ce, Pr, Nd, Sm, Eu, Gd, Tb, Dy, Ho, Er, Tm, Yb, Ti, Co, U, Ni, Fe, V, and Er.

4. A passive Q-switch for a laser system as in claim 3, wherein the concentration of said dopant ion is 10 ppm-10,000 ppm.

5. A passive Q-switch for a laser system as in claim 3, operative in the wavelength region of 0.2-5 μm.

6. A passive Q-switch for a laser system as in claim 5, operative in the eye safe wavelength region of 1.0-1.7 μm.

7. A passive Q-switch for a Laser system as in claim 3, wherein said glass ceramic material combines the properties of stimulated emission and saturable absorption.

8. A passive Q-switch for a laser system as in claim 3, wherein the content of said cobalt is 0.09-0.14 weight percent.

9. An optical fiber comprising a glass-ceramic material, said glass-ceramic material comprising a glass phase and a crystal phase, said crystal phase comprising gahnite crystals, or gahnite crystals and β-quartz-like solid solution, said glass-ceramic material comprising the following components, expressed in terms of mole percent:

|  | mole % |
|---|---|
| $SiO_2$ | 63-75 |
| $Al_2O_3$ | 8-12.5 |
| ZnO | 6-10 |
| $Li_2O$ | 2-5 |
| $TiO_2$ | 1-4 |
| $ZrO_2$ | 0.5-3, | wherein said crystal phase is doped with at least one dopant ion selected from the group consisting of:
Ce, Pr, Nd, Sm, Eu, Gd, Tb, Dy, Ho, Er, Tm, Yb, Ti, Co, U, Ni, Fe, V, and Er.

10. An optical fiber as in claim 9, wherein said optical fiber is drawn from a preform.

11. An optical fiber as in claim 10, wherein said preform is prepared from separate parts for a core and a cladding of said optical fiber, each of said parts for said core and said cladding having a different refraction index.

12. An optical fiber as in claim 10, wherein core of said optical fiber has a cylindrical shape with diameter of 0.5-5 mm, and length of 50-1,000 mm.

13. An optical fiber as in claim 10, wherein cladding of said optical fiber has a tube shape with inner diameter of 0.5-5 mm, outer diameter of 5-50 mm, and length of 50-1,000 mm.

14. An optical fiber as in claim 9, wherein said optical fiber is used for an element selected from the group consisting of:
saturable absorber;
passive Q-switch;
amplification element;
lasing element;
communication fiber optic;
element for amplified spontaneous emission suppression;
element for noise suppression;
element for spectrum correction; and
element for signal attenuation.

15. A laser system comprising a passive Q-switch, said passive Q-switch comprising a glass-ceramic material, said glass-ceramic material comprising a glass phase and a crystal phase, said crystal phase comprising gahnite crystals, or gahnite crystals and β-quartz-like solid solution, said glass-ceramic material comprising the following components, expressed in terms of mole percent:

|  | mole % |
|---|---|
| $SiO_2$ | 63-75 |
| $Al_2O_3$ | 8-12.5 |
| ZnO | 6-10 |
| $Li_2O$ | 2-5 |
| $TiO_2$ | 1-4 |
| $ZrO_2$ | 0.5-3, | wherein said crystal phase is doped with at least one dopant ion selected from the group consisting of: Ce, Pr, Nd, Sm, Eu, Gd, Tb, Dy, Ho, Er, Tm, Yb, Ti, Co, U, Ni, Fe, V, and Er.

16. A laser system as in claim 15, wherein said laser system is a monolithic laser, comprising an amplification element
directly bonded with said passive Q-switch.

17. A laser system as in claim 16, wherein said amplification element comprises an element selected from the group consisting of:
glass ceramic;
glass; and
single crystal.

* * * * *